United States Patent [19]
Van Der Tol

[11] Patent Number: 5,524,156
[45] Date of Patent: Jun. 4, 1996

[54] POLARIZATION AND WAVELENGTH INDEPENDENT OPTICAL POWER SPLITTING CIRCUIT

[75] Inventor: Johannes J. G. M. Van Der Tol, Zoetermeer, Netherlands

[73] Assignee: Koninklijke PTT Nederland N.V., Netherlands

[21] Appl. No.: 456,052

[22] Filed: May 31, 1995

[30] Foreign Application Priority Data

Jun. 17, 1994 [NL] Netherlands ............... 9400993

[51] Int. Cl.$^6$ ............................................. G02B 6/26
[52] U.S. Cl. ................. 385/28; 385/29; 385/11; 385/43; 385/45
[58] Field of Search .................. 385/11, 14, 15, 385/27, 28, 29, 39, 42, 43, 45, 41, 50

[56] References Cited

U.S. PATENT DOCUMENTS

| | | | |
|---|---|---|---|
| 3,920,314 | 11/1975 | Yajima | 385/9 |
| 5,151,957 | 9/1992 | Riviere | 385/11 X |
| 5,185,828 | 2/1993 | Van Der Tol | 385/28 |
| 5,285,507 | 2/1994 | Van Der Tol | 385/11 |
| 5,418,867 | 5/1995 | Van Der Tol | 385/11 |

FOREIGN PATENT DOCUMENTS

| | | | |
|---|---|---|---|
| 0330457 | 8/1989 | European Pat. Off. . | |
| 0469793 | 2/1992 | European Pat. Off. . | |
| 0513919 | 11/1992 | European Pat. Off. . | |
| 62-17708 | 1/1987 | Japan | 385/28 |
| 4-104229 | 4/1992 | Japan | 385/28 |

OTHER PUBLICATIONS

K. Liou et al., "Y-Junction Power Divider in InGaAsP–InP Photonic Integrated Circuits", IEEE Journal of Quantum Electronics, vol. 26, No. 8, Aug. 1990, pp. 1376–1383.

S. Safavri–Naeini et al., "Design and Analysis of Novel Multimode Optical Filters in Dielectric Waveguide", Journal of Lightwave Technology, vol. 11, No. 12, Dec. 1993, pp. 1970–1977.

R. Thurston et al., "Analysis of Mode Separation in Multi-channel Branching Waveguides", IEEE Journal of Quantum Electronics, vol. QE–23, No. 8, Aug. 1987, pp. 1245–1255.

J. J. G. M. van der Tol et al., "Mode Evolution Type Polarization Splitter on InGaAsP/InP", IEEE Photonics Technology Letters, vol. 5, No. 12, Dec. 1993, pp. 1412–1414.

D. Yap et al., "Coupling between successive Ti:LiNbO$_3$ waveguide bends and branches", Applied Optics, vol. 23, No. 17, Sep. 1984, pp. 2991–2999.

*Primary Examiner*—Rodney B. Bovernick
*Assistant Examiner*—Hemang Sunghavi
*Attorney, Agent, or Firm*—Peter L. Michaelson

[57] ABSTRACT

An optical waveguide circuit comprises a mode splitter and an input guide (1/4/6.1) and first and second output guides (6.2/2, 6.3/3), and a mode converter (5) incorporated in the input guide for converting a fraction of an optical signal ($I_i$), entering via the input waveguide, of a first propagation mode into a second propagation mode having mutually different order. The mode converter (5) has a first waveguiding section (5.1) and a second waveguiding section (5.2), which adjoin each other via a single discontinuity (7). The first and second sections (5.1 and 5.2) have propagation modalities, as a result of which, at the discontinuity, a coupling can take place between two propagation modes of different order, whereas the extent (x) of discontinuity determines the fraction of conversion for obtaining a desired splitting ratio in emitting signals ($I_{o1}$, $I_{o2}$).

20 Claims, 5 Drawing Sheets

POLARIZATION AND WAVELENGTH INDEPENDENT OPTICAL POWER SPLITTING CIRCUIT

A. BACKGROUND OF THE INVENTION

1. Field of the Invention

The invention is in the field of integrated optical circuits. More particularly, it relates to an integrated optical waveguide circuit for splitting an optical input signal into two output signals with optical powers in a predetermined splitting ratio.

2. Prior Art.

Splitting optical signals is one of the most important functions in an optical system. For optical distribution systems of, for example, TV signals from a sending location to a large number of receivers optical 1→N splitters are known, which often are composed of optical 3 dB splitters. A 3 dB splitter is a power splitter in which the optical power of an optical input signal is evenly distributed over two output signals, having therefore a splitting ratio of 50/50. For optical signal monitoring or in optical control loops often smaller fractions, for example 10%, are split out of the optical power of an optical signal. Depending on the physical principle applied, known splitters can roughly be distinguished into two kinds. A first kind is based on interference. Splitting circuits in which a direction coupling device or an MZ-interferometer is applied belong to this kind. Although said circuits are of a relatively short length, they require well-defined phase-relations between the different optical signals and consequently a narrow manufacturing tolerance. Furthermore, they are polarisation and wavelength dependent and it is often difficult to realise specific splitting ratios having a sufficient accuracy. A second splitter kind is based on symmetry. The type most generally known of this kind is the symmetric Y splitter which possesses a mono-modal waveguiding trunk, branching symmetrically into two mono-modal wave guiding branches. Due to its symmetry, it principally is a 3 dB splitter. A second type of said second kind, for example, is known through references [1] and [2]. Said second type relates to an asymmetric Y splitter having a mono-modal trunk, which widens adiabatically to a bi- or multi-modal waveguide and subsequently splits into two mono-modal branches having different propagation constants at a relatively large splitting angle. In this connection, the coupling area adjacent to the splitting point between the two branches forms a disruption, as a result of which partial conversions in propagation modes are caused, in an optical signal entering via the trunk, from the zero order to the first order. The signals which have different orders of propagation mode subsequently further propagate via the different branches. The extent of conversion consequently determines the splitting ratio and, inter alia, depends on the widths chosen for the two branches and on the size of the angle between both branches. A splitting point which to a large degree reflection-free is attained by having the effective refraction index in the propagation direction decrease gradually in the area between both branches starting from the splitting point. Although this known asymmetric Y splitter is polarisation-independent to a high degree and to some extent wavelength-independent, a desired specific splitting ratio cannot be realised easily. A third splitter type of the second kind, with which a well-defined fraction can be split out of an optical signal, is known through reference [3]. Said splitter is a combination of a mode converter and an asymmetric Y splitter used as a modus splitter. In this combination, the asymmetric Y splitter has a bi-modal wave guiding trunk which splits at a relatively small angle into two mono-modal branches having different propagation constants and is incorporated in the bi-modal trunk of a mode-converter. Depending on the magnitude of the order of the propagation mode of an input signal in the bi-modal trunk, the light mainly couples in the one or the other of both branches. As a result of a specific periodical structure of the mode converter, of an optical signal, a desired fraction of a zero propagation mode is converted into a first propagation mode. Although said known splitter has a splitting ratio which can be defined well, as a consequence of the interferometric nature of the mode converter it is selective, to a high extent, for wavelength and polarisation of the optical signal used.

B. SUMMARY OF THE INVENTION

The object of the invention is to provide a power splitter which can be integrated, in a simple manner, with a well-definable splitting ratio, which power splitter is based on a combination of a mode splitter with a mode converter not based upon interference. The invention is based on the fact that a discontinuity in a bi-modal or, more in general, a multi-modal waveguide causes a partial mode conversion in an optical signal, propagating in accordance with a first propagation mode in said waveguide, to a signal propagating in a second propagation mode, with the two propagation modes differing in order number. In this connection it has been found, that if for the discontinuity, for example, an offset or a sudden widening is chosen, in case the extent of offset or widening increases, the extent of conversion can increase monotonically to approximately 50%, and that this behaviour appears almost independently of the wavelength of the optical signal (at least in the wavelength area which is of importance for optical fibre communication). Furthermore, it has been found that the width(s) of the waveguiding sections at both sides of the discontinuity in the bi- or multi-modal waveguide can be chosen in such manner that a high extent of polarisation-independence is also obtained. This means that such a discontinuity which can be dimensioned to a desired conversion fraction in a simple manner can very well be used as an interference-free mode converter.

An integrated optical waveguide circuit for splitting an optical input signal into two output signals having optical powers in a predetermined splitting ratio, said circuit comprising a mode splitter having an input waveguide and a first and a second output waveguide, with a mode converter being incorporated into the input waveguide for converting a fraction of a signal entering via the input waveguide of a first propagation mode into a second propagation mode of different order, said mode converter including a first waveguiding section and a second waveguiding section, and the mode splitter emitting signals, which enter via the input guide and propagate in propagation modes of different order, via different output guides, which optical circuit is of a kind known from reference [3], is according to the invention characterised in that the first waveguiding section and the second waveguiding section of the mode converter adjoin each other via a single discontinuity, with the extent of discontinuity corresponding to the fraction of conversion for obtaining said splitting ratio.

Generally, at a discontinuity in a waveguide substantial reflections appear. A discontinuity defines a coupling plane or coupling area in which the conversion or coupling takes place between guided modes different in order number. It appears that the length of the coupling area can be chosen in such manner that reflections are largely suppressed, and yet the desired conversion fraction is obtained. Preferably, the discontinuity in the waveguide circuit defines a coupling area having a length in dependence of propagation constants of guided modes in the first and second section.

In a further preferred embodiment the discontinuity has a jumpy transition between two wave guiding subsections, such as an offset or an abrupt change in width of the subsections, with the extent of offset or change in width corresponding to the conversion fraction desired. In a further preferred embodiment the discontinuity is formed by a taper. With tapers, both symmetric and asymmetric discontinuities can be constructed.

In still a further preferred embodiment the mode splitter is an asymmetric Y splitter dimensioned as such, as a result of which the entire circuit can be realised having one type of waveguide, such as the rib type.

C. REFERENCES

[1] EP-A-0469793;

[2] K.-Y. Liou et al.: Y junction power divider in InGaAsP-InP photonic integrated circuits, IEEE J. Quantum Electron., August 1990, pp. 1376–1383;

[3] EP-A-0513919.

All references are assumed being incorporated in the present application.

D. SHORT DESCRIPTION OF THE DRAWING

The invention will hereinafter be described on the basis of a drawing comprising the following Figures:

FIG. 1 diagrammatically shows in top view a first embodiment of an optical power splitting circuit in accordance with the invention;

Figure 7:
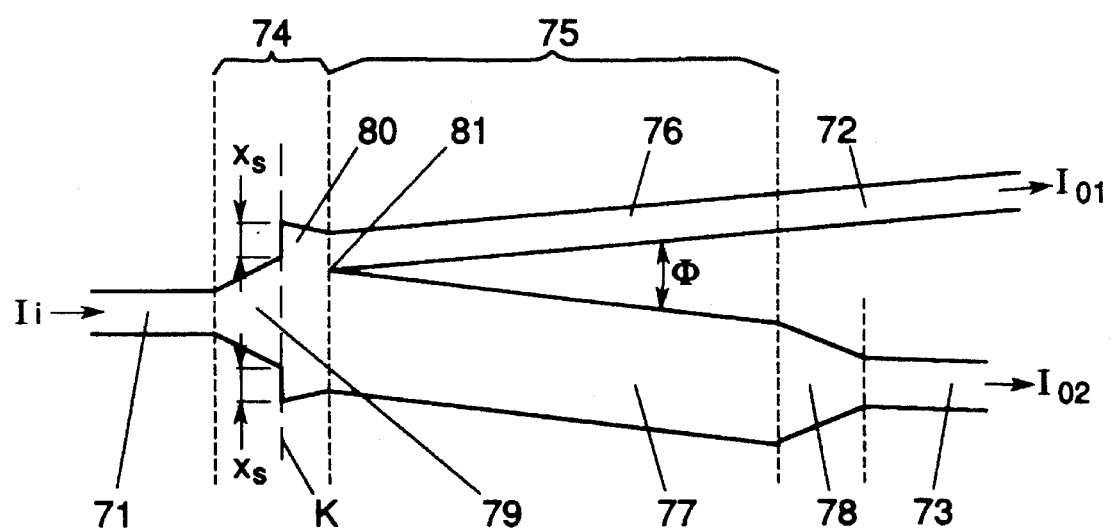
Figure 6A:
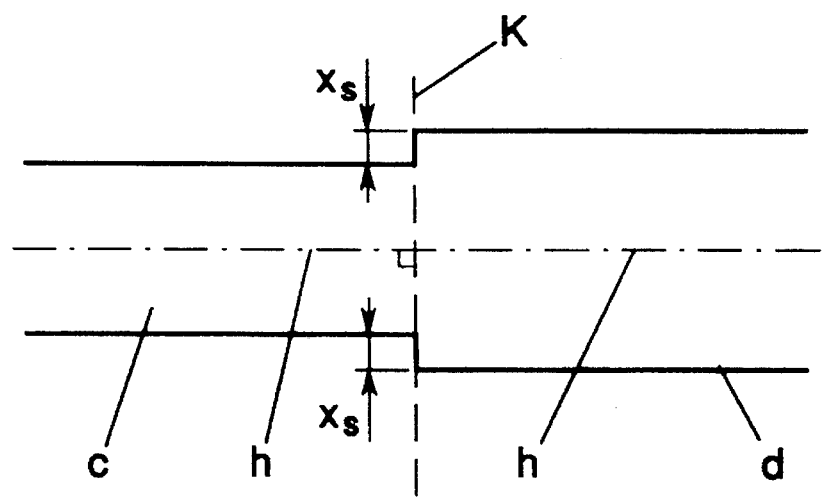
Figure 6B:
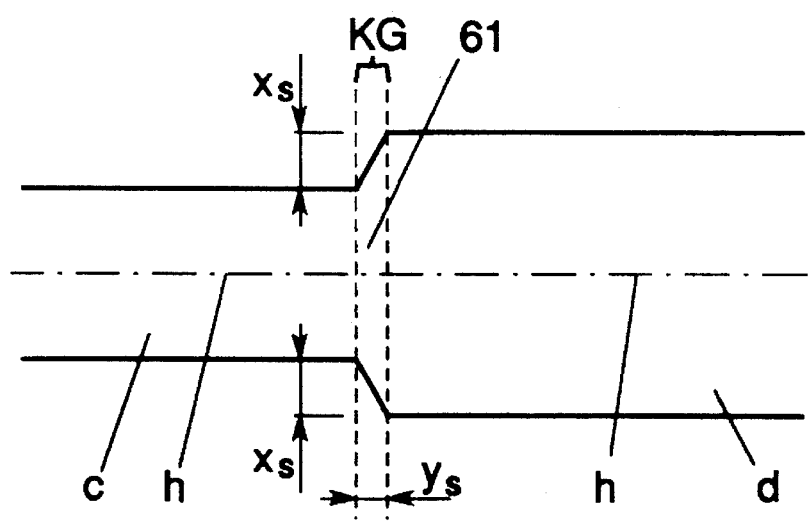

FIG. 6A diagrammatically shows a symmetric discontinuity;

FIG. 6B shows a modification of a symmetric discontinuity in accordance with FIG. 6A;

FIG. 7 shows in top view a second embodiment of an optical power splitting circuit in accordance with the invention with a symmetric discontinuity being incorporated.

E. DESCRIPTION OF AN EXEMPLARY EMBODIMENT

Figure 1:
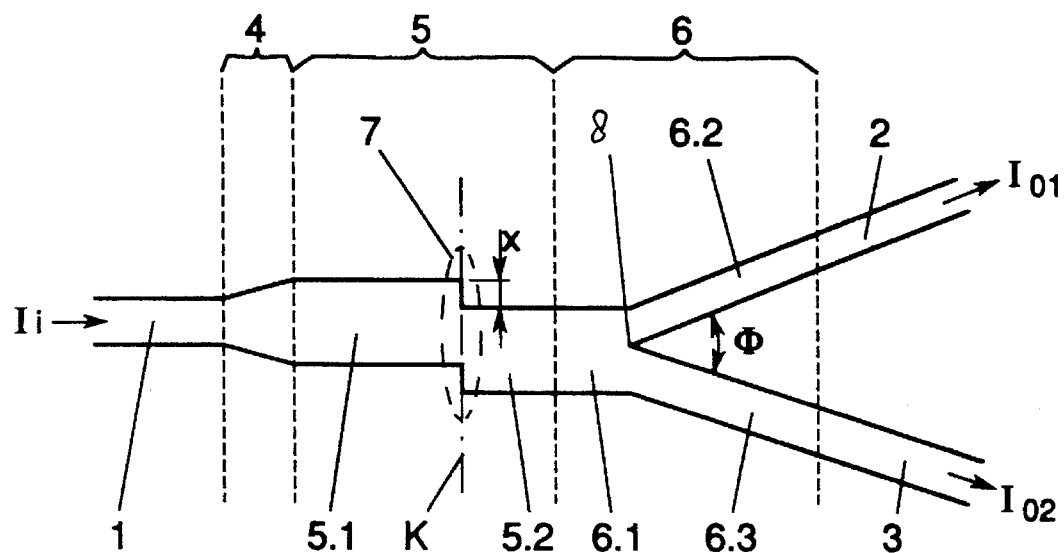

FIG. 1 shows diagrammatically a first exemplary embodiment of an optical power splitting circuit in accordance with the invention. The circuit comprises a mono-modal wave guiding input channel 1 and two mono-modal wave guiding output channels 2 and 3. Between the input channel 1 and the two output channels 2 and 3 have been incorporated, successively, a taper section 4 for the adiabatic transition from a mono-modal to a bi-modal wave guiding channel, a bi-modal wave guiding intermediate section 5 directly adjoining the taper section 4, and an asymmetric Y splitter 6 dimensioned as a mode splitter and having a bi-modal wave guiding trunk 6.1 and two mono-modal wave guiding branches 6.2 and 6.3 differing in propagation constants.

The wave guiding branches 6.2 and 6.3 mutually divert at an diversion angle $\phi$, and outside their mutual interaction area pass into the output channels 2 and 3, respectively. The bi-modal intermediary section 5 comprises two subsections 5.1 and 5.2, which adjoin each other via a discontinuity 7, i.e. are coupled to each other. The plane in which the two sections are coupled to each other is called coupling plane, indicated by K in the Figure. If, in the coupling plane, the cross section profiles of the two wave guiding subsections 5.1 and 5.2 do not exactly fall over each other, this is a jumpy discontinuity. The extent to which the cross section profiles of the two wave guiding subsections 5.1 and 5.2 divert from each other in the coupling plane K determines the extent of the discontinuity. In the Figure, the discontinuity is symbolically represented by a mutual offset of the two subsections over a distance indicated by x.

Figure 2:
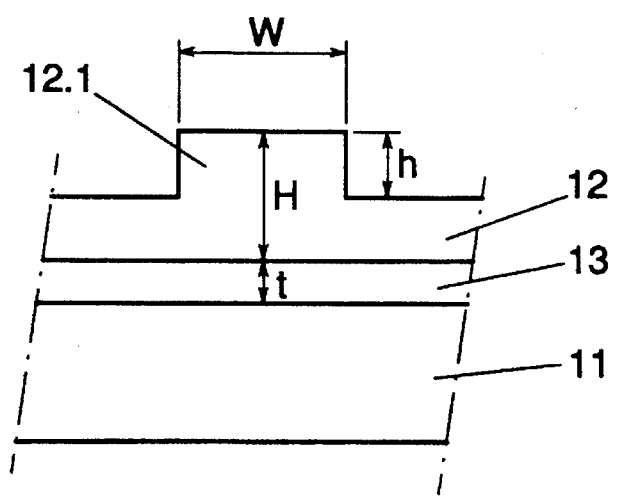
FIG. 2 shows diagrammatically in a cross section a profile of a waveguide of the rib type.

It is known, that at a jumpy discontinuity in a waveguide, in which optical signals in accordance with different guided modes can propagate, mode conversions can be realised from a guided mode upstream of the discontinuity into another guided mode downstream of the discontinuity, with the extent of conversion being expressed by a coupling constant which is specific for said conversion. The kind of conversion that can take place depends on according to which guided mode a signal in the direction of the discontinuity propagates, on which guided modi are possible in the waveguide before and after the discontinuity, and on the symmetry of the discontinuity. If the discontinuity is asymmetric, conversions are also possible between guided modes having an odd difference in order number, whereas a symmetric discontinuity only permits conversions between guided modes having an even difference in order number. A discontinuity in a waveguide therefore has the meaning of such an abrupt transition between two successive subsections of the waveguide, that such conversions can take place between guided modes having different order numbers. A discontinuity is symmetric if the two successive subsections of the waveguide and the intermediately located transition have a common plane of symmetry. Any other discontinuity is asymmetric. The extent of conversion, i.e. the size of the coupling constant, has been found to depend, to a large degree, on the extent of discontinuity. This will hereinafter be illustrated on the basis of a discontinuity in a channel-like type of waveguide generally used in integrated optical devices on the basis of semi-conducting materials, i.e. a rib type waveguide. Of such a type of waveguide, in FIG. 2, a cross section is shown, only by way of example on the basis of indium phosphide (InP). Between a substrate 11 and a top layer 12, both of InP, a light-guiding layer 13 is located, the so-called quaternary layer of InGaAsP having a thickness t. The top layer 12 locally shows, over the length of the guide, a rib-like elevation 12.1 having a hight h and width w, which for example, is obtained by partially etching away a top layer which initially had a thickness H. With such a type of waveguide, any channel-like waveguide, or part thereof, of the device shown in FIG. 1 can be realised, with only the width w varying.

Figure 3:
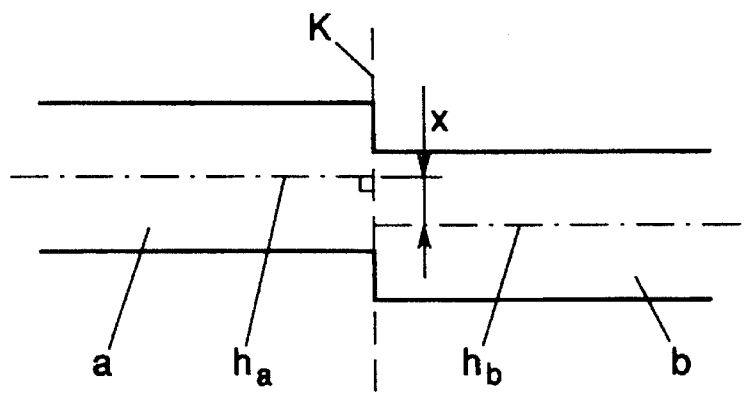
FIG. 3 shows diagrammatically a first asymmetric discontinuity for the circuit of FIG. 1.

When using a rib-like type of channel-like waveguide, several modifications in discontinuity are possible, to which the subsections 5.1 and 5.2 of the waveguide 5 in FIG. 1 can adjoin. First it is necessary to distinguish into an asymmetric and a symmetric discontinuity. It concerns, in any case, an asymmetric discontinuity if the central optical axes of two waveguides adjoining each other are mutually offset before and after the discontinuity, with the waveguide profiles not necessarily differing from each other, whereas for a symmetric discontinuity the central axes are in an extension of each other and the waveguide profiles are different. FIG. 3 shows a first asymmetric discontinuity to which two waveguiding sections a and b, respectively adjoin each other laterally in an offset manner, having central axes $h_a$ and $h_b$, and having one and the same waveguide profile, i.c. an identical width. At the location of the offset, in the coupling plane located perpendicular to both central axes $h_a$ and $h_b$, the central axes are offset over a distance x.

When using such an asymmetric discontinuity in the optical circuit of FIG. 1, the circuit operates as follows. An optical signal $I_i$ entering the mono-modal input channel 1 propagates in the fundamental mode, i.e. zero order mode, via the taper section 4 and the bi-modal subsection 5.1 of the section 5 as far as the asymmetric discontinuity 7. In the coupling plane K of the discontinuity 7 a fraction α of the signal $I_i$ is converted into a signal which further propagates in the first order guided mode in the bi-modal subsection 5.2, whereas a non-converted part β of the signal $I_i$ further propagates in the zero order guided mode. It has to be noted that α and β are ratio numbers of signal intensities. As a result of the difference in order number of the guided modes of the converted and non-converted parts of the signal, said parts propagate in the asymmetric Y splitter 6 along different wave guiding branches 6.2 and 6.3 to the output channels 2 and 3. If of both branches, the branch 6.2 has the lowest propagation constant (which in case of the waveguide profile of FIG. 2 corresponds to the smallest width), a signal $I_{o1}$ emitting out of output channel 2 corresponds to the converted fraction α of the input signal $I_i$, whereas a signal $I_{o2}$ emitting out of output channel 3 corresponds to the non-converted part β. Since due to reflection and radiation modes some signal losses always occur at the discontinuity, this means that (α+β)<1 and that some attenuation will occur. In the FIG. 4A and FIG. 4B, the splitting ratio α/β and the attenuation D (dB) have been plotted out as a function of the distance x, over which the central axes of the wave guiding subsections 5.1 and 5.2 have offset. The numerical values plotted out in said Figures have been obtained by simulation on the basis of a simulation method which is generally known under the name "beam propagation method" (BPM). In the case of this simulation the following data have been used:

a TE polarised light signal having wavelength (λ): 1.55 μm refraction indexes: InP: 3.169 and InGaAsP: 3.289 thickness (t) of the light-guiding layer 13 (InGaAsP): 0.46 nm thickness (H - h) of the top layer 12 (InP): 0.25 nm rib hight (h) of the rib 12.1:0.25 nm Intermediate section 5:

length: of no influence; rib width of the subsections 5.1 and 5.2: 6.0 μm.

Asymmetric Y splitter 6:

length: approx. 2.8 mm; width of branch 6.2: 2.0 μm; width of branch 6.3: 3.2 μm; diversion angle φ between the branches 6.2 and 6.3: 3.85 mrad (=0.22°).

Figure 4A:
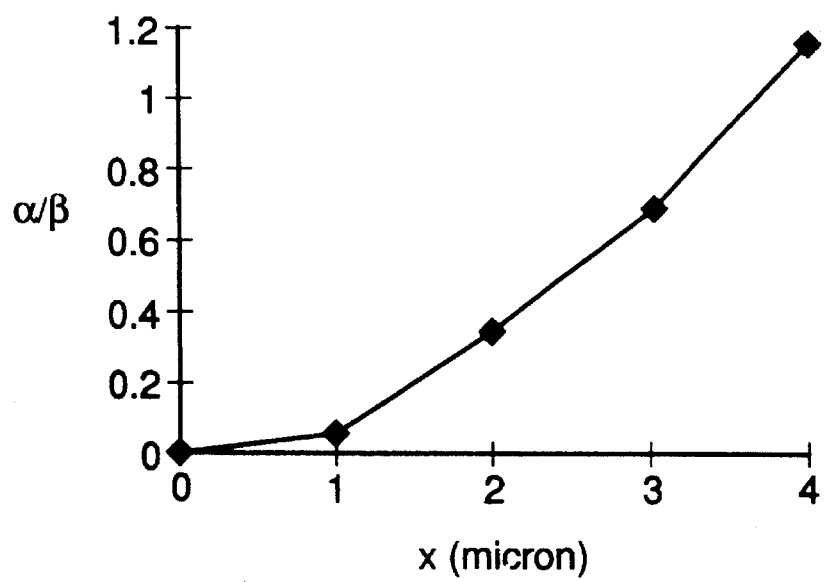
FIGS. 4A and 4B show graphically the course of the splitting ratio $\alpha/\beta$ and of the attenuation D, respectively, as a function of the extent of offset x, as simulated in a power splitting circuit in accordance with FIG. 1 while using an asymmetric discontinuity in accordance with FIG. 3.
Figure 4B:
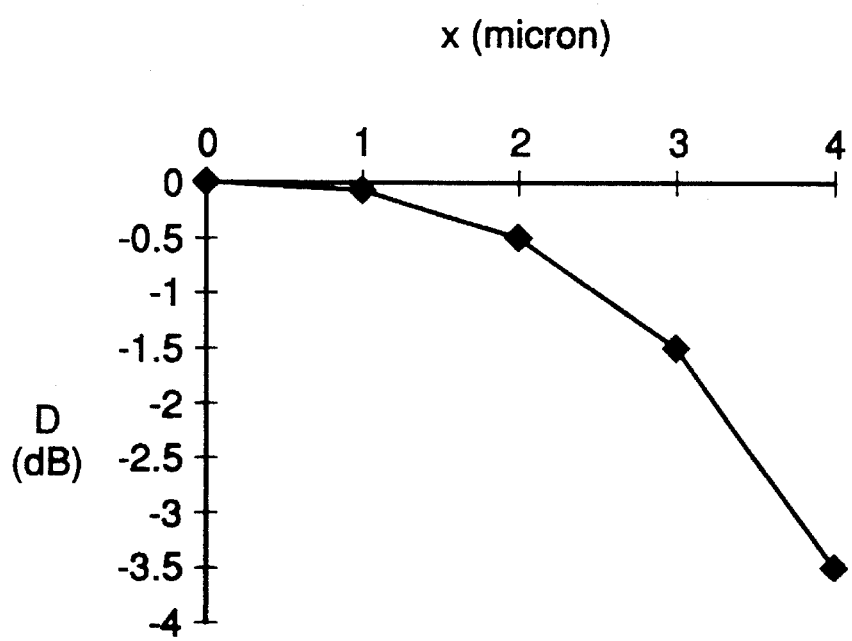

The subsection 5.2 of the intermediate section 5 and the trunk 6.1 of the asymmetric Y splitter 6 are in this connection simulated as being one adiabatic taper having a length of 90 μm and a width decreasing from 6.0 μm to 5.2 μm. FIG. 4A shows that, by selecting the appropriate x, any value for the splitting ratio α/β between 0 and 1 can be realised; whereas FIG. 4B shows that, in this connection, the attenuation D remains restricted to approximately half of the signal intensity (approx. −3 dB). As a matter of fact, the fraction α is proportional to the square of x. This means that a signal splitting circuit can be constructed in a simple manner, basically, with every desired splitting ratio. For uses where high splitting ratios, for example larger than 0.4, are necessary, the occurring attenuation which is also proportional to the square of x can form a restricting factor.

Furthermore, the splitting nature of the circuit in accordance with FIG. 1 having a discontinuity in accordance with FIG. 3 at a value x=1.1 μm, is simulated for light signals having wavelengths of 1.3 and 1.55 μm and with the TE and the TM polarisation. For said wavelengths the refraction indexes are, respectively, 3.209 and 3.169 in InP, and 3.352 and 3.289 in InGaAsP. The following splitting ratios (in dB) were found:

(TM, 1.55): 10 dB (TE, 1.55): 10.7 dB (TM, 1.3): 9.8 dB (TE, 1.3): 9.9 dB

From the values found, a high extent of both wavelength and polarisation independence (<1 dB) appears. It was also found that in all cases the attenuation was less than 0.3 dB.

For obtaining an extent of polarisation-insensitivity as high as possible, preferably, the widths of the wave guiding subsections 5.1 and 5.2 are maximally chosen for a bi-modal propagation for both polarisations TE and TM.

If the input channel 1 has been realised as a bi-modal waveguide, which without a taper section passes directly into the subsection 5.1 of the intermediate section 5, of a first order mode input signal a fraction which is dependent on x is converted into a zero order mode signal by the discontinuity 7, which signal then propagates further in the Y splitter via a branch other than the non-converted part. This means that with a circuit thus realised a fraction determined by the size of x can be split from a first order signal. However, it has been found that with one and the same value for x and one and the same fraction of conversion, with a zero order mode input signal a lower attenuation occurs than with a first order mode input signal. More in general, for realising a minimal attenuation, the order number of the guided mode of the input signal should be chosen as low as possible.

Figure 5A:
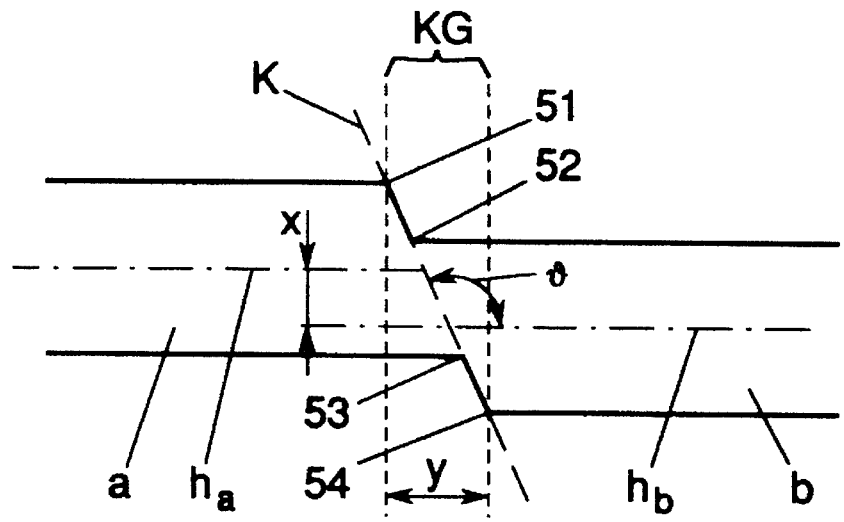
FIG. 5A shows a first modification of an asymmetric discontinuity as shown in FIG.3.

In FIG. 3 the coupling plane K of the discontinuity is chosen perpendicular to the direction of the central axes $h_a$ and $h_b$. This is not necessary. By choosing an angle φ≠90° between the central axes and the coupling plane, the reflecting action of the discontinuity is also decreased. A first modification of such a discontinuity is represented in FIG. 5A. Preferably, the angle ⊖ is chosen in such manner that edge points 51, 52, 53 and 54 of a rib pattern, realising the waveguiding sections a and b and which edge points being situated in the coupling plane, correspond to obtuse angles. Obtuse-angled edges can more precisely be defined in a photo-lithographic manner. In said first modification, the discontinuity extends in the propagation direction over a length y equal to the length of the projection of the coupling plane K between the edge points 51 and 54 on one of the central axes $h_a$ or $h_b$. In fact, this is no longer a coupling plane but a coupling area KG.

Figure 5B:
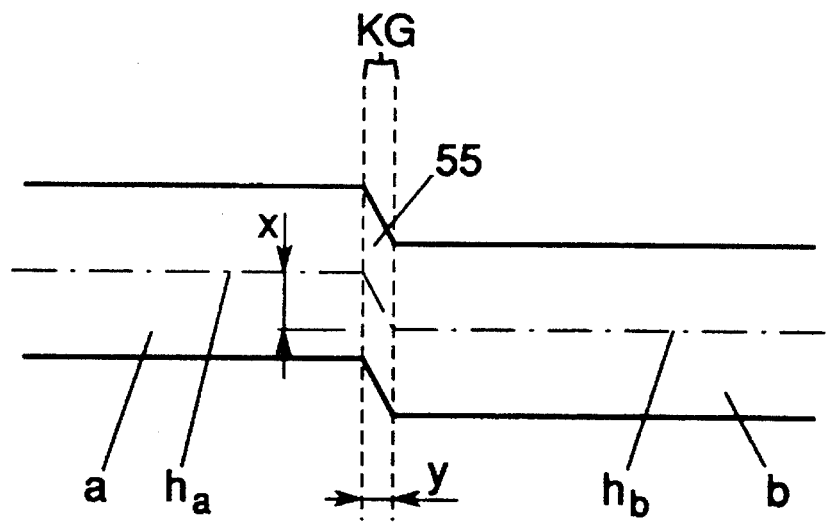
FIG. 5B shows a second modification of an asymmetric discontinuity as shown in FIG. 3.

In FIG. 5B a second modification of a discontinuity having a decreased reflecting action is shown. In said second modification, the discontinuity is formed by a short taper 55 having length y between two mutual offset waveguiding sections a and b. Here also, no longer a coupling plane exists but a coupling area KG having a length y.

For a good converting function of a discontinuity and at the same time a strong suppression of the reflection at the discontinuity, in both modifications the length y of the coupling area KG is delimited.

On the one hand, the length y must be much smaller than the beat length between the guided modes of the non-converted signal part and the converted signal part in the waveguiding section b, consequently beyond the discontinuity. (N.B. beat length must be understood as the propagation distance over which the phase-relations between two guided modes repeat themselves). On the other hand, the length y must be much larger than the beat length between the guided modes of the input signal and a signal reflected at the discontinuity in the waveguiding section a. For a discontinuity in accordance with one of the modifications represented in FIG. 5A or 5B and incorporated in the bi-modal intermediate section 5 (FIG. 1), this can be expressed mathematically in an inequality {1}:

$$\Lambda_{0\to 0}=\pi/\beta_0 << y << \Lambda_{0\to 1}=2\pi/(\beta_0-\beta_1) \qquad \{1\}$$

In which:

$\Lambda_{0\to 0}$ is the beat length between the zero order guided modes of a signal propagating into the direction of the discontinuity and a signal reflected at the discontinuity;

$\Lambda_{0\to 1}$ is the beat length between a zero order guided mode and a first order guided mode of a signal moving away from the discontinuity; and $\beta_0$ and $\beta_1$, respectively, are the propagation constants of the zero order guided mode in the waveguiding section a and the first order guided mode in the waveguiding section b.

For waveguides on the basis of indium phosphide, the beat length $\Lambda_{0\to 0}$ is in the order of 1 μm, and the beat length $\Lambda_{0\to 1}$ is in the order of 100 μm and higher. A good choice for the length y therefore is approx. 10 μm. Such a choice accordingly means that the transition between the two waveguiding sections a and b (or the subsections 5.1 and 5.2 in FIG. 1) can be designed such that it functions as a discontinuity for forwards propagating guided modes, but as an adiabatic transition for two guided modes propagating mutually in opposite direction, so that at the transition no or hardly no reflection occurs.

For the converting function of a discontinuity in accordance with the modifications shown in FIG. 3, FIG. 5A and FIG. 5B, the length of the waveguiding sections a and b before and after the transition is of no importance. If such a discontinuity is incorporated into the intermediary waveguiding section 5 of the circuit of FIG. 1, in which the length of the subsections 5.1 and 5.2 is in fact chosen as equal to zero, then a third modification arises as a result of which the total length of the circuit can be restricted. The coupling plane K of the discontinuity then is situated directly to the end of the taper section 4. Even the length of the trunk 6.1 of the asymmetric Y splitter can be chosen in such a short manner that a splitting point 8 (this being the point where both branches 6.2 and 6.3 start to divert) is almost situated in the coupling plane K. The trunk 6.1 can also be realised as an adiabatic taper in order to be able to chose, with a given width of the trunk 6.1, at the height of the splitting point 8, the desired width in the coupling plane K.

FIG. 6A shows a symmetric discontinuity, to which two waveguiding sections c and d adjoin with a common central axis h. Said symmetric discontinuity is formed by a jumpy symmetric change in width, i.e. a widening or narrowing in each of both directions perpendicular to the central axis h of in total $2x_s$.

FIG. 6A shows, by way of example, a widening. At the location of the widening, a coupling plane K is again formed which is situated perpendicular to the common central axis h.

FIG. 6B shows a modification of a symmetric discontinuity having a decreased reflecting effect, in which the transition between both wave guiding subsections c and d is formed by a short symmetric taper 61 having a length $Y_s$, of which the width increases symmetrically by in total $2x_s$. As a result of this, a coupling area KG exists, having a length $Y_s$. For said length $Y_s$ similar limits apply as expressed in inequality {1}. If for example the waveguiding sections c and d must both be tri-modal, in the inequality {1} the propagation constant $\beta_1$ must be replaced by a propagation constant $\beta_2$ for a second order guided mode.

FIG. 7 diagrammatically shows a second exemplary embodiment of an optical power splitting circuit, in which a symmetric discontinuity is used. The circuit comprises a mono-modal wave guiding input channel 71 and two mono-modal wave guiding output channels 72 and 73. Between the input channel 71 and the two output channels 72 and 73 have been incorporated, successively, an intermediate section 74, and an asymmetric Y splitter 75 dimensioned as a mode splitter and having two wave guiding branches 76 and 77 differing in propagation constants. The branch 76 is mono-modal and outside the interaction area with the branch 77 directly passes into the mono-modal output channel 72. The wave guiding branch 77 is bi-modal and outside the interaction area with the branch 76 directly passes into the mono-modal output channel 73 via an adiabatic taper 78. The intermediate section 74 comprises two adiabatic tapers 79 and 80, which mutually adjoin in a coupling plane K via a symmetric jumpy widening with the size of $2x_s$. The adiabatic taper 79 increases in width from a width which suits a mono-modal waveguide to a waveguide having a desired width, whereas the width of the taper 80 from the coupling plane gradually changes into (in FIG. 7 decreases to) the sum of the widths of the branches 76 and 77 at the height of a splitting point 81, i.e. at the point where the branches 76 and 77 divert.

The circuit in accordance with FIG. 7 operates in a similar manner as the circuit of FIG. 1. A signal $I_i$, entering via the input channel 71, propagating in the zero order guided mode reaches the coupling plane K in the transition of the tapers 79 and 80 in the intermediate section 74 in an undisturbed manner.

There a fraction dependent on the size of $x_s$ of the zero order mode signal is converted into a signal which in taper 80 propagates further in a second order guided mode. The non-converted part further propagates in the zero order guided mode. Arriving at the splitting point 81, the converted part of the signal in the second order mode propagates further as a zero order mode signal in the branch having the lowest propagation constant, i.e. the mono-modal branch 76, and emits as an output signal $I_{o1}$ via the output channel 72.

The non-converted part of the signal in the zero order mode further propagates via the bi-modal branch 77 and the taper 78, and emits as an output signal $I_{o2}$ via the output channel 73.

The splitting behaviour of said second embodiment has also been simulated with the following dimensioning (with the other parameters being the same as used in the simulations relating to the first exemplary embodiment):

Input channel 71: width 3 μm
Intermediary section 74:
  taper 79: rib width increasing from 3 μm to 7.4 μm over a length of 125 μm;
  jumpy widening $2x_s$: 4.6 μm;
  taper 80: rib width decreasing from 12.0 μm to 9.7 μm over a length of 70 μm;
Asymmetric Y splitter 75:
  length: approx. 4.0 mm; width of branch 76: 2.0 μm; width of branch 77:7.7 μm; diversion angle φ between the branches 76 and 77: 1.75 mrad (=0.1°).
Taper 78: rib width decreasing from 7.7 μm to 3 μm over a length of 140 μm.
The following splitting ratios (in dB) were found:
  (TM, 1.3): 10.9 dB
  (TE, 1.3): 10.9 dB
  (TM, 1.55): 10.6 dB
  (TE, 1.55): 10.6 dB
In all cases the attenuation is less than 0.2 dB.

This second embodiment shows an even better polarisation and wavelength-independence. Although the dimensioning of the asymmetric Y junction, in this simulation, has not yet been optimized, the asymmetric Y junction appears to become somewhat longer than in the first embodiment. However, since the difference in propagation constants between the zero and the second order guided modes is larger than the difference between the zero order and first order guided modes, it may nevertheless be expected that a mode splitter will be more efficient for the first-mentioned pair of modes and can therefore be realised in a shorter manner. Moreover, the wave guiding intermediate section in which the symmetric discontinuity has been incorporated, can be chosen much wider, viz. to quadri-modal, since due to the symmetry of the discontinuity not only the first order, but also the third order guided mode can not be excited. (N.B. Such a quadri-modal width has already been incorporated in the simulation of the splitting behaviour of the second embodiment.) This has as a consequence that the wavelength and polarisation independent nature can still be enhanced, since the effect of an evanescent field of a waveguide, of which possible remaining polarisation and wavelength dependence originates, decreases with increasing width of a waveguide.

I claim:

1. An integrated optical waveguide circuit for splitting an optical input signal into two output signals having optical powers in a predetermined splitting ratio, said circuit comprising a mode splitter having an input waveguide and a first and a second output waveguide, with a mode converter being incorporated into the input waveguide for converting a fraction of a signal entering via the input waveguide of a first propagation mode into a second propagation mode of different order, said mode converter including a first waveguiding section and a second waveguiding section, and the mode splitter emitting signals, which enter via the input guide and propagate in propagation modes of different order, via different output guides, wherein the first waveguiding section and the second waveguiding section of the mode converter adjoin each other via a single discontinuity, with the extent of discontinuity corresponding to the fraction of conversion for obtaining said splitting ratio.

2. An optical circuit in accordance with claim 1, wherein the discontinuity defines a coupling area having a length in dependence of propagation constants of guided modes of the first and second section.

3. An optical circuit in accordance with claim 2, wherein the first and second waveguiding sections adjoin each other via a transition formed by a taper.

4. An optical circuit in accordance with claim 3, wherein the first and second waveguiding sections have identical waveguide profiles and adjoin each other with an offset, with the extent of the offset corresponding to said fraction.

5. An optical circuit in accordance with claim 3, wherein the first and second waveguiding sections have waveguiding sections having different widths, with the difference in width corresponding to said fraction.

6. An optical circuit in accordance with claim 1, wherein the first and second waveguiding sections adjoin each other via a jumpy transition.

7. An integrated optical waveguide circuit for splitting an optical input signal into two output signals having optical powers in a predetermined splitting ratio, said circuit comprising a mode splitter having an input waveguide and a first and a second output waveguide, with a mode converter being incorporated into the input waveguide for converting a fraction of a signal entering via the input waveguide of a first propagation mode into a second propagation mode of different order, said mode converter including a first waveguiding section and a second waveguiding section, and the mode splitter emitting signals, which enter via the input guide and propagate in propagation modes of different order, via different output guides, wherein the first waveguiding section and the second waveguiding section of the mode converter adjoin each other via a single discontinuity, with the extent of discontinuity corresponding to the fraction of conversion for obtaining said splitting ratio, and wherein the mode splitter includes an asymmetric Y splitter provided with a wave guiding trunk directly coupled to the second waveguiding section, and with a first and second wave guiding branch, which first branch and second branch, respectively, have been coupled to the first and second output guide, and mutually differ in propagation constant.

8. An optical circuit in accordance with claim 7, wherein the second waveguiding section is bi-modal and the two wave guiding branches of the asymmetric Y splitter and the two output waveguides are mono-modal, and that the input waveguide, successively, comprises a mono-modal wave guiding input section, a taper section for the adiabatic transition from the monomode wave guiding input section to the first waveguiding section, the first waveguiding section and the second waveguiding section, with the first and second waveguiding section adjoining each other asymmetrically.

9. An optical circuit in accordance with claim 8, wherein the discontinuity defines a coupling area having a length in dependence of propagation constants of guided modes of the first and second section.

10. An optical circuit in accordance with claim 9, wherein the first and second waveguiding sections adjoin each other via a transition formed by a taper.

11. An optical circuit in accordance with claim 8, wherein the first and second waveguiding sections adjoin each other via a jumpy transition.

12. An optical circuit in accordance with claim 11, wherein the first and second waveguiding sections have waveguiding sections having different widths, with the difference in width corresponding to said fraction.

13. An optical circuit in accordance with claim 8, wherein at least one of the first and second waveguiding sections has a length substantially equal to zero.

14. An optical circuit in accordance with claim 7, wherein the second waveguiding section at least is tri-modal and at most is quadri-modal and the two output waveguides are mono-modal, and that the input waveguide, successively, comprises a mono-modal wave guiding input section, a taper section for the adiabatic transition from the mono-modal wave guiding input section to the first waveguiding section, the first waveguiding section and the second waveguiding section, with the first and second waveguiding section adjoining each other symmetrically, and that the first branch of the asymmetric Y junction is a mono-modal waveguide which directly passes into the first output waveguide, and the second branch is a bimodal waveguide which passes into the second output waveguide via an adiabatic taper.

15. An optical circuit in accordance with claim 14, wherein the discontinuity defines a coupling area having a length in dependence of propagation constants of guided modes of the first and second section.

16. An optical circuit in accordance with claim 15, wherein the first and second waveguiding sections adjoin each other via a transition formed by a taper.

17. An optical circuit in accordance with claim 14, wherein the first and second waveguiding sections adjoin each other via a jumpy transition.

18. An optical circuit in accordance with claim 17, wherein the first and second waveguiding sections have identical waveguide profiles and adjoin each other with an offset, with the extent of the offset corresponding to said fraction.

19. An optical circuit in accordance with claim 17, wherein the first and second waveguiding sections have waveguiding sections having different widths, with the difference in width corresponding to said fraction.

20. An optical circuit in accordance with claim 14, wherein at least one of the first and second waveguiding sections has a length substantially equal to zero.

* * * * *